(12) United States Patent
Marchionni et al.

(10) Patent No.: US 7,705,113 B2
(45) Date of Patent: *Apr. 27, 2010

(54) PROCESS FOR PREPARING PEROXIDIC PERFLUOROPOLYETHERS

(75) Inventors: Giuseppe Marchionni, Milan (IT); Pier Antonio Guarda, Milan (IT); Elvira Pagano, Milan (IT)

(73) Assignee: Solvay Solexis S.p.A., Milan (IT)

( * ) Notice: Subject to any disclaimer, the term of this patent is extended or adjusted under 35 U.S.C. 154(b) by 1090 days.

This patent is subject to a terminal disclaimer.

(21) Appl. No.: 11/366,598

(22) Filed: Mar. 3, 2006

(65) Prior Publication Data

US 2006/0205921 A1 Sep. 14, 2006

(30) Foreign Application Priority Data

Mar. 10, 2005 (IT) .......................... MI2005A0383

(51) Int. Cl.
*C08G 73/00* (2006.01)
*C08G 73/24* (2006.01)
*C07C 409/00* (2006.01)

(52) U.S. Cl. .................. 528/401; 528/397; 528/402; 568/560; 562/850

(58) Field of Classification Search .................. 528/397, 528/401, 402; 568/560; 562/850
See application file for complete search history.

(56) References Cited

U.S. PATENT DOCUMENTS

| 3,715,378 A | 2/1973 | Sianesi et al. |
| 4,451,646 A | 5/1984 | Sianesi et al. |
| 5,777,291 A | 7/1998 | Marchionni et al. |
| 5,783,789 A | 7/1998 | Guarda et al. |

FOREIGN PATENT DOCUMENTS

| EP | 0 790 268 A3 | 8/1997 |
| EP | 0 790 270 A2 | 8/1997 |
| EP | 1 524 287 A1 | 4/2005 |
| EP | 1 568 730 A1 | 8/2005 |

OTHER PUBLICATIONS

International Search Report.
Marchionni et al., "Perfluoropolyethers: Synthesis and Commercial Products", Proceedings of the Fluoropolymers Conference, 1992, Umist Manchester 1992, Paper 14, 13 pp.
Sianesi et al., "Perfluoropolyethers (PFPEs) from Perfluoroolefin Photooxidation", Plenum Press, 1994, pp. 431-461.

*Primary Examiner*—Duc Truong
(74) *Attorney, Agent, or Firm*—Arent Fox LLP

(57) ABSTRACT

A process for preparing peroxidic perfluoropolyethers having a perioxidic content (PO) lower than or equal to 1.2 of formula $$A-CF_2O(CF_2CF_2O)_m(CF_2O)_n-(CF_2CF_2OO)_{ml}(CF_2OO)_{n1}CF_2-B \quad (I)$$

Wherein
A, B equal to or different from each other are —Cl, —F, —F$_2$CCl, —COF, —OCOF, —CF$_3$,
m, m1, n, n1 are integers such that the (m+m1)/(n+n1) ratio is between 0.6 and 1.3 and the m/n ration is between 0.5 and 1.2;
the number average molecular weight is in the range 35,000-45,000,
by tetrafluoroethylene (TFE) photooxidation in the presence of UV light, at a temperature from −80° C. to −40° C., in the presence of a mixture of solvents formed of HFC-227 (heptafluoropropane) and a solvent selected between HFC-125 (pentafluoroethane) and FC-218 (perfluoropropane).

8 Claims, No Drawings

PROCESS FOR PREPARING PEROXIDIC PERFLUOROPOLYETHERS

The present invention relates to a process for preparing peroxidic perfluoropolyethers having a peroxidic content (PO), expressed in g of active oxygen per 100 g of peroxidic perfluoropolyether, lower than or equal to 1.2 by tetrafluoroethylene (TFE) photooxidation in the presence of solvents environmental friendly.

More specifically, the invention relates to a process for preparing peroxidic perfluoropolyethers having a peroxidic content (PO) lower than or equal to 1.2 using a drop-in solvent of CFC 12 by tetrafluoroethylene (TFE) photooxidation.

Still more specifically, the invention relates to a process for preparing, by tetrafluoroethylene (TFE) photooxidation, peroxidic perfluoropolyethers having a peroxidic content (PO) lower than or equal to 1.2 using a drop-in solvent of CFC 12 capable to give substantially the same peroxidic precursors from which the various commercial products are obtained.

It is known that peroxidic perfluoropolyethers (PFPEs) are used as precursors of various perfluoropolyether-based compounds commercially known as Fomblin® Z and Fomblin® M.

In particular the Fomblin® Z reported in Table 1 are obtained by starting from peroxidic perfluoropolyethers having formula

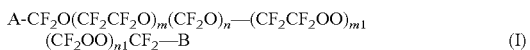

$$\text{A-CF}_2\text{O(CF}_2\text{CF}_2\text{O)}_m\text{(CF}_2\text{O)}_n\text{—(CF}_2\text{CF}_2\text{OO)}_{m1}\text{(CF}_2\text{OO)}_{n1}\text{CF}_2\text{—B} \quad (I)$$

wherein A and B, equal to or different from each other, are selected in the group formed of —Cl, —F, —F$_2$CCl, —COF, —OCOF, —CF$_3$;

m, m1, n, n1 are integers such as to obtain the number average molecular weight indicated below, and having:

PO between 0.5 and 1.0;

m/n between 0.5 and 0.8, n being different from 0;

number average molecular weight in the range 35,000-45,000.

The Fomblin®M reported in Table 2 are obtained by starting from peroxidic perfluoropolyethers having formula (I) but having:

PO between 1.0 and 1.2;

m/n between 0.8 and 1.2, n being different from 0;

number average molecular weight in the range 35,000-45,000.

All the peroxidic perfluoropolyethers of formula (I) are prepared according to a process comprising the TFE photooxidation at temperatures between −40° C. and −80° C. wherein as solvent the dichloro-difluoromethane (CFC-12) is used. The teachings of U.S. Pat. No. 3,715,378, U.S. Pat. No. 4,451,646 are followed to prepare the above precursors.

From said peroxidic precursors of formula (I), through elimination of the peroxidic bonds by thermal treatment at temperatures between 160° and 250° C. and subsequent fluorination of the —COF and —OCOF end groups, according to what described for example in Marchionni G., Srinivasan P., "Proceedings of the Fluoropolymer Conference 1992", UMIST Manchester 1992, Paper 14, non functionalized perfluoropolyethers are obtained having formula:

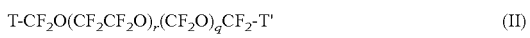

$$\text{T-CF}_2\text{O(CF}_2\text{CF}_2\text{O)}_r\text{(CF}_2\text{O)}_q\text{CF}_2\text{-T'} \quad (II)$$

wherein r, q are integers such that the r/q ratio is between 0.5 and 1.2, q being different from 0;

the number average molecular weight is between 1,000 and 30,000;

the chain end groups T and T', equal to or different from each other, are non functional end groups of the —(CF$_2$)$_p$ Z type, wherein p is an integer and can be 0 or 1 and Z is an halogen selected between fluorine and chlorine.

See also the publication by Sianesi et al., "Organic Fluorine Chemistry, Principles and Commercial Applications", Plenum Press 1994, pages 431-461; in particular pages 431-440.

The transformation of compounds of formula (I) into compounds of formula (II) implies a negligible variation of the ratio (CF$_2$CF$_2$O)/(CF$_2$O), i.e. the m/n ratio of peroxidic precursor (I) substantially remains equal to the r/q ratio of compound (II). The perfluoropolyethers of formula (II) are then subjected to molecular distillation to obtain the various commercial grades of the products reported in the Tables 1, 2. These distillations do not substantially change the ratios between (CF$_2$CF$_2$O), (CF$_2$O) units. Therefore the commercial products Fomblin M® and Fomblin Z® have the (CF$_2$CF$_2$O)/(CF$_2$O) ratios substantially similar to those of their peroxidic precursors (I). It is therefore essential to have available the two classes of the above mentioned specific precursors to be able to obtain the non peroxidic commercial products.

The processes for preparing the compounds of formula (I) using CFC 12 require several and difficult efforts of modifications of the reaction conditions to prepare the two above precursor types from which the commercial products, having the technical specifics reported in Tables 1 and 2, are obtained. However, it is well known that CFCs, following the Montreal Protocol and its amendments, have been banned or are going to be shortly banned.

It was desirable to have available a process for preparing the precursors of formula (I) having the above PO, molecular weight and m/n values, by using a solvent environmental friendly towards the ozone (ODP) and preferably having a low greenhouse effect (GWP), and being a drop-in solvent of CFC-12 capable to give the same peroxidic precursors, in particular the same peroxidic precursors of the two above classes.

U.S. Pat. No. 5,777,291, in the name of the Applicant, indicates perfluoropropane (FC 218) as substitute of CFC-12. However, by operating under the same processing conditions: reactor volume, gaseous reactant flow-rates, radiant power, reaction temperature, peroxidic perfluoropolyethers of formula (I) are obtained having m/n ratios different from those obtained by operating with CFC-12. In particular peroxidic perfluoropolyethers, having a m/n ratio higher than that obtained with CFC-12, are obtained. Therefore the corresponding derivatives of formula (II) have a higher r/q ratio. These ratio variations are not admissible in the above commercial products as they are sold with well defined technical specifics. Indeed the final users require products with specifics as they have their processes and/or products depending on the well defined technical specifics of the products reported in Tables 1-2. From the commercial point of view, when the products are not within the specifics, they are not accepted by the user to avoid that their use brings to variations in the performances of the final product or process. For example, when the perfluoropolyethers of formula (II) have r/q ratios different from those of the commercial products of Tables 1, 2, they show chemico-physical properties, as for example viscosity, density and Tg (glass transition temperature), different from those of the commercial products of Tables 1-2 and therefore are not suitable to meet the requirements of the users.

The above properties are essential for said perfluoropolyethers Fomblin® Z and Fomblin® M as they are generally used as lubricating oils or greases under conditions requiring wide temperature rates, for example between −100° C. and +250° C.

U.S. Pat. No. 5,783,789, in the name of the Applicant, indicates HFC 125 (pentafluoroethane) as solvent in the TFE photooxidadation. According to this patent, mixtures of HFC 125 with $C_3$-$C_7$ perfluorocarbons act likewise HFC 125. Tests carried out by the Applicant have however shown that HFC 125 does not allow to synthetize peroxidic perfluoropolyethers having a high molecular weight (number average molecular weight), for example higher than 30,000 dalton. If one tries to prepare products having molecular weights between 35,000 and 45,000 there is an uncontrolled separation of the peroxidic product. This brings cloggings in the plant, reduces the thermal exchange and causes product stagnations with explosion risks of when the PO exceeds the 4.5 value. As a matter of fact, under these synthesis conditions, an uncontrolled PO increase takes place. Therefore the process using HFC-125 as a solvent has drawbacks as it is not possible to prepare the peroxidic PFPEs of formula (I) having number average molecular weights in the range 35,000-45,000, necessary to obtain the commercial products of Tables 1-2.

EP application 04 022 780.3, in the name of the Applicant, describes HFC-227ea (2-hydroheptafluo-ropropane) as solvent in the photooxidation processes of TFE. However, by operating under the same conditions of CFC-12, peroxidic perfluoropolyethers of formula (I) are obtained having m/n ratios different from those obtained by using CFC-12. In particular peroxidic perfluoropoly-ethers having a lower m/n ratio are obtained. The consequence is that the corresponding derivatives of formula (II) have a lower r/q ratio. As above said, this means the obtainment of products having chemico-physical properties as viscosity, density and Tg different from those of the commercial products of Tables 1-2.

The need was therefore felt to have available a process for preparing the precursors of formula (I) having the above PO, molecular weight and m/n values, by using a solvent environmental friendly, drop-in of CFC-12 and capable to give substantially the same peroxidic precursors of the above classes.

It has been surprisingly and unexpectedly found it is possible to overcome the above drawbacks as described below.

An object of the present invention is therefore a process for preparing peroxidic perfluoropolyethers having a peroxidic content (PO) lower than or equal to 1.2 of formula:

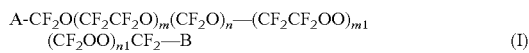

(I)

wherein
A, B, equal to or different from each other are selected from the group formed of —Cl, —F, —F$_2$CCl, —COF, —OCOF, —CF$_3$;
m, m1, n, n1 are integers such that the (m+m1)/(n+n1) ratio is between 0.6 and 1.3, where (n+n1) is different from 0 and the m/n ratio is between 0.5 and 1.2, where n is different from 0;
the number average molecular weight is in the range 35,000-45,000;

wherein:
when m/n is between 0.5 and 0.8 (n being different from 0), the PO is between 0.5 and 1.0;
when m/n is between higher than 0.8 and 1.2 (n being different from 0), the PO is between higher than 1.0 and 1.2;

by tetrafluoroethylene (TFE) photooxidation in the presence of UV light, at low temperature, preferably from −80° C. to −40° C., more preferably from −65° C. to −50° C., in the presence of a mixture of solvents formed of HFC-227 (heptafluoropropane) and a solvent selected from HFC-125 (pentafluoroethane) and FC-218 (perfluoropropane), in a volumetric ratio HFC 125 (or FC 218)/HFC 227 between 90/10 and 10/90, preferably between 85/15 and 30/70, in the presence of a chain transfer agent.

Preferably the chain transfer agent is selected from fluorine diluted with an inert gas or chlorotrifluoroethylene.

As solvent, ternary mixtures of HFC-227 with HFC-125 and FC-218 can also be used.

Generally the TFE concentration is between 0.005 and 0.06 moles/liter of reaction mixture, preferably between 0.01 and 0.05 moles/liter. Therefore the TFE flow-rate is such as to obtain said concentrations.

The oxygen amount is generally such to saturate the reaction mixture. Generally an oxygen molar excess with respect to TFE is used and the partial oxygen pressure is generally between 0.1 and 2 atm, preferably between 0.2 and 1 atm.

Preferably the volumetric ratio HFC 125/HFC 227 is between 90/10 and 40/60, more preferably between 85/15 and 70/30.

Preferably the volumetric ratio FC 218/HFC 227 is comprised between 70/30 and 30/70.

HFC 125/227 mixtures are preferred due to their low environmental impact (low GWP).

The UV light having a wave length between 200 and 350 nm is used with a radiant power with respect to the reactor volume between 5 and 40 W/liter, preferably between 10 and 30 W/liter of reaction mixture.

The peroxidic perfluoropolyethers (I) precursors of the Fomblin Z® of Table 1 have a PO between 0.5 and 1.0, a number average molecular weight in the range 35,000-45,000 and a m/n ratio between 0.5 and 0.8. To preparing said peroxidic perfluoropolyethers with the process of the present invention one preferably operates under the following conditions:

temperature between −55° C. and −50° C.;
feeding TFE flow-rate per volume unit between 10 and 30 kg/(h·m$^3$);
feeding O$_2$ flow-rate such that the molar ratio O$_2$/TFE is between 1.1 and 3;
a volumetric ratio HFC 125/227 between 85/15 and 70/30,
or a volumetric ratio FC-218/HFC-227 between 70/30 and 30/70;
in the presence of a chain transfer agent selected from fluorine diluted with an inert gas or chlorotrifluoroethylene, in an amount that the molar ratio chain transfer agent/tetrafluoroethylene is between 1·10$^{-2}$ and 1·10$^{-3}$ and, in case of fluorine, the chain transfer agent is diluted with the inert gas in volume ratios from 1/50 to 1/1,000.

The peroxidic perfluoropolyethers (I) from which the Fomblin® M of Table 2 are obtained have a PO between 1.0 and 1.2, a number average molecular weight in the range 35,000-45,000 and a m/n ratio between 0.8 and 1.2. To preparing said peroxidic perfluoropolyethers with the process of the present invention one preferably operates under the following conditions:

temperature between −65° C. and −55° C.;
feeding TFE flow-rate per volume unit between 10 and 30 kg/(h·m$^3$);
feeding O$_2$ flow-rate such that the molar ratio O$_2$/TFE is between 1.1 and 3;

a volumetric ratio HFC 125/227 between 85/15 and 70/30, or a volumetric ratio FC-218/HFC-227 between 70/30 and 30/70;

in the presence of a chain transfer agent selected from fluorine diluted with an inert gas or chlorotrifluoroethylene, in an amount that the molar ratio chain transfer agent/tetrafluoroethylene is between $1 \cdot 10^{-2}$ and $1 \cdot 10^{-3}$ and, in case of fluorine, it is diluted with the inert gas in volume ratios from 1/50 to 1/1,000.

The products commercially known as Fomblin® M are used in a wide range of temperatures between −80° C. and +300° C. as lubricating oils, as bases for fluorinated greases, as hydraulic fluids in the presence of ionizing radiations.

The products commercially known as Fomblin® Z are used in a temperature range wider than that used in Fomblin® M, in particular at low temperatures, for example in aerospace applications.

As said, the process of the present invention has made available mixtures of drop-in solvents of CFC 12 in the preparation of commercial perfluoropolyethers. In particular the process of the present invention allows to substitute the CFC-12 solvent without modifying the operating conditions of the photooxidation process of TFE to prepare commercial perfluoropolyethers and therefore without cost increase, obtaining peroxidic perfluoropolyethers having the same structure as those of formula (I), from which the perfluoropolyethers required by the market and marketed, reported in Tables 1-2, are obtained.

Some illustrative but non limitative Examples of the present invention follow.

EXAMPLES

Characterization

Iodometric Analysis

The analysis of the peroxidic content (PO) is carried out according to the following procedure: one dissolves a weighed amount of polymer (some grams) in about 20 ml of Galden® ZT 130, 1 ml of acetic acid and 30 ml of a sodium iodide solution at 5% in isopropyl alcohol are added. The mixture is put under strong stirring for 15 minutes and the iodine developed from the reaction with the peroxide is titrated with an aqueous solution of sodium thiosulphate having a known titre, by using a Mettler DL40 potentiometric titrator equipped with a platinum electrode and a reference electrode.

The peroxide content (PO) is expressed in grams of active oxygen (MW=16) per 100 grams of peroxidic perfluoropolyether.

$^{19}$F-NMR Analysis

The molecular weight is determined by $^{19}$F-NMR spectroscopy by using an instrument operating at 400 MHz frequency. The spectrum shows the signals due to the fluorine atoms linked to the chain end groups as $CF_3O$—, $CF_3CF_2O$—, $ClCF_2O$—, $ClCF_2CF_2O$—, $FC(O)CF_2O$—, $FC(O)O$— and to the repeating units present in the polymeric chain $(CF_2CF_2O)$, $(CF_2O)$, $(CF_2CF_2OO)$, $(CF_2OO)$. From the ratio between the signals of the fluorine atoms linked to the end groups and those of the repeating units present in the polymeric chains the number average molecular weight is calculated.

Example 1

Preparation of a Peroxidic Perfluoropolyether (PFPE) with PO=1.05% by Using a HFC-125/227ea Mixture The continuous photosynthesis plant is equipped with: a high pressure mercury lamp inserted in the coaxial sheath of the 30 liter cylindrical reactor and cooled by means of circulating demineralized water; with reacting gas feeding lines and a drawing line of the reaction mixture, connected to an evaporation column of the reaction solvent from the product.

The reactor is cooled to −65° C. and 50 kg of HFC-125/227ea 72/28 w/w mixture are introduced corresponding to a ratio by volume of 75/25.

Then 250 Nl/h of oxygen are initially fed and immediately after the mercury lamp is turned on having a radiant power equal to 330 W in the UV wave length range between 200 and 350 nm.

Then 0.8 kg/h of tetrafluoroethylene together with the oxygen are then fed and 0.3 Nl/h of CTFE ($CF_2CFCl$) are fed through another bubbling inlet. The extraction flow-rate of the reaction mixture is such as to have a constant concentration of peroxidic perfluoropolyether in the solvent, in the order of 7%.

The product obtained in stationary conditions shows the following characteristics: a peroxidic content (PO), determined by iodometric analysis, of 1.05 g of active oxygen/100 g of polymer. The $^{19}$F-NMR analysis confirms the following structure:

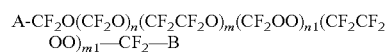

wherein the end groups —$CF_2$-A and —$CF_2$—B are equal to or different from each other. The end groups and the respective molar percentages with respect to the total of the end groups are the following: —$CF_3$ 22.00%; —$CF_2Cl$ 36.9%; —$CF_2COF$ 41.1%. The number average molecular weight is 41,000; m=203.43, m1=20.21, n=216.41, n1=5.50, from which it results a m/n ratio=1.04.

Example 2

Comparative

The Example 1 was repeated but by using CFC-12 as solvent. The obtained peroxidic PFPE has a PO, determined by iodometric analysis, of 1.1 g of active oxygen/100 g of polymer. The $^{19}$F-NMR analysis confirms the following structure:

wherein the end groups —$CF_2$-A and —$CF_2$—B are equal to or different from each other. The end groups and the respective molar percentages with respect to the total of the end groups are the following: —$CF_3$ 15.3%; —$CF_2Cl$ 42.23%; —$CF_2COF$ 42.45%. The number average molecular weight is 37,300; m=196.70, m1=18.83, n=175.41, n1=5.12; m/n=1.12.

By comparing the data of the Example 1 with the data of the Example 2 (comparative), it results that the peroxidic PFPEs obtained with the HFC 125/227ea mixture of the invention are substantially equal to those obtained by using CFC-12 since they substantially have the same number average molecular weight (MW), the same PO and the same m/n ratio among the ether $(CF_2CF_2O)$, $(CF_2O)$ structures.

Example 3

Comparative

The Example 1 was repeated but by using only HFC-227ea as solvent instead of the HFC-227 mixture with HFC-125 (or with FC-218) of the present invention.

The obtained peroxidic PFPE has a peroxidic content (PO), determined by iodometric analysis, of 1.25 g of active oxygen/100 g of polymer. The $^{19}F$-NMR analysis confirms the following structure:

wherein the end groups $-CF_2$-A and $-CF_2$-B are equal to or different from each other. The end groups and the respective molar percentages with respect to the total of the end groups are the following: $-CF_3$ 30.3%; $-CF_2Cl$ 22.23%; $-CF_2COF$ 47.5%. The number average molecular weight is 37,300; m=180.31, m1=21.53, n=272.58, n1=12.81; m/n=0.66.

By comparing the Example 1 with the Example 3 comparative, it results evident that the product obtained by using HFC-227ea pure, even though it shows molecular weight and PO values suitable for preparing the commercial products of Table 2 (Fomblin® M), shows a structural m/n ratio much lower than the required values (m/n=0.8-1.2) for preparing said Fomblin® M.

Example 4

Preparation of a Peroxidic Perfluoropolyether (PFPE) with PO=1.2% by Using a HFC-227ea/FC-218 Mixture One operates under the same conditions of the Example 1 but by using a HFC-227ea/FC-218 mixture in a 53/47 w/w ratio corresponding to a ratio by volume 50/50 and lowering the flow-rates to 0.53 kg/h of TFE, 0.2 Nl/h of CTFE and 250 Nl/h of $O_2$.

A peroxidic raw product having a PO equal to 1.2 is obtained having formula

A-CF$_2$O(CF$_2$O)$_n$(CF$_2$CF$_2$O)$_m$(CF$_2$OO)$_{n1}$(CF$_2$CF$_2$OO)$_{m1}$—CF$_2$—B wherein the end groups $-CF_2$-A and $-CF_2$-B are equal to or different from each other. The end groups and the respective molar percentage with respect to the total of the end groups are the following: $-CF_3$ 31.7%; $-CF_2Cl$ 33.1%; $-CF_2COF$ 35.2%. The number average molecular weight is 43,000; m=187.09, m1=41.86, n=223.73, n1=12.26, from which it results a m/n ratio=0.84.

Example 5

Obtainment of the Commercial Products Fomblin® M from a Peroxidic Perfluoropolyether (PFPE) (I)

The peroxidic perfluoropolyether obtained in the Example 1 was reduced by thermal treatment.

A 1 liter glass flask is used equipped with mechanical stirrer, sheath for the temperature control, dropping funnel, two-way fitting for the fluorine inlet ($F_2$; transfer agent) and reaction gas outlet (mainly $COF_2$), glass bubbling inlet for the continuous outflow of the treated product, so that the level of the reaction mass is maintained constant.

390 g of peroxidic perfluoropolyether obtained in the Example 1 are introduced, under stirring, one heats with oil bath until reaching a temperature of 230° C. One starts then to feed into the reactor the peroxidic perfluoropolyether with a flow-rate equal to 280 grams/h and contemporaneously the transfer agent with a flow-rate of 0.5 Nl/h.

These flow-rates are maintained during the whole test, lasting 10 hours.

2,560 g of substantially non peroxidic product are obtained, with a yield of 80%, which is then heated in a stirred reactor to 240° C. until the complete elimination of the small amounts of residual PO and subjected to fluorination.

The obtained product has the following formula:

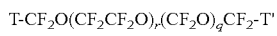

wherein the end groups $-CF_2T$ and $-CF_2T'$ are equal or different. The end groups and the respective molar percentages with respect to the total of the end groups are the following: $-CF_3$ 77.57%; $-CF_2Cl$ 22.42%; the number average molecular weight is equal to 20,000; r=109.3 and q=111 resulting in a r/q ratio between the ether units equal to 0.98.

Said product is then fractionated by molecular distillation under vacuum to give the commercial products Fomblin® M reported in Table 2.

By comparing the m/n ratio of the peroxidic PFPE with the r/q ratio of the product obtained therefrom, it is evident that the thermal treatment does not substantially change the ratio between the ether units $(CF_2CF_2O)/(CF_2O)$.

Example 6

Preparation of a Peroxidic Perfluoropolyether (PFPE) with PO 0.94% by Using a HFC-125/227ea Mixture The Example 1 was repeated but by using a reaction temperature equal to −55° C. The obtained peroxidic perfluoropolyether has a PO, determined by iodometric analysis, of 0.94 g of active oxygen/100 g of polymer. The $^{19}F$-NMR analysis confirms the following structure:

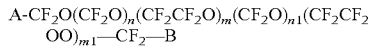

wherein the end groups $-CF_2$-A and $-CF_2$-B are equal to or different from each other. The end groups and the respective molar percentages with respect to the total of the end groups are the following: $-CF_3$ 29.3%; $-CF_2Cl$ 33.2%; $-CF_2COF$ 37.5%. The number average molecular weight is 37,200; m=166.50, m1=15.31, n=234.91, n1=4.39, m/n=0.71.

Example 7

Comparative

The Example 6 was repeated but by using CFC-12 as solvent. The obtained peroxidic PFPE results to have a PO, determined by iodometric analysis, of 0.92 g of active oxygen/100 g of polymer. The $^{19}F$-NMR analysis confirms the following structure:

wherein the end groups —CF$_2$-A and —CF$_2$—B are equal to or different from each other. The end groups and the respective molar percentages with respect to the total of the end groups are the following: —CF$_3$ 25.39%; —CF$_2$Cl 37.4%; —CF$_2$COF 37.1%. The number average molecular weight is 37,000; m=172.43, m1=15.86, n=220.18, n1=4.55, m/n=0.78.

By comparing the data of the Example 6 with the data of the Example 7 (comparative), it results that the peroxidic PFPEs obtained with the HFC 125/227ea mixture of the invention are substantially equal to those obtained by using CFC-12 since they substantially show the same number average molecular weight (MW), the same PO and the same m/n ratio between the ether structures (CF$_2$CF$_2$O), (CF$_2$O)

Example 8

Comparative

The Example 6 was repeated but by using only FC 218 as solvent.

The obtained peroxidic PFPE results to have a PO, determined by iodometric analysis, of 1.24 g of active oxygen/100 g of polymer. The $^{19}$F-NMR analysis confirms the following structure:

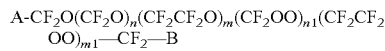

A-CF$_2$O(CF$_2$O)$_n$(CF$_2$CF$_2$O)$_m$(CF$_2$OO)$_{n1}$(CF$_2$CF$_2$OO)$_{m1}$—CF$_2$—B wherein the end groups —CF$_2$-A and —CF$_2$—B are equal to or different from each other. The end groups and the respective molar percentages with respect to the total of the end groups are the following: —CF$_3$ 15.2%; —CF$_2$Cl 42.76; —CF$_2$COF 42.1%. The number average molecular weight is 38,200; m=218.17, m1=17.23, n=155.8:3, n1=4.05; m/n=1.4.

By comparing the Example 6 with the Example 8 (comparative), it is evident that the peroxidic PFPEs obtained by using only FC-218 show a m/n ratio out of the range of the values required for preparing the commercial Fomblin® M (m/n=0.8-1.2) and Fomblin® Z (m/n=0.5-0.8).

Example 9

Comparative

The Example 6 was repeated but using only HFC 125 as solvent.

After 4 hours the test was interrupted since the separation of the peroxidic perfluoropolyether from the reaction solvent occurred. The reaction environment being unhomogeneous, an uncontrolled growth of the PO and of the molecular weight was obtained: the peroxidic content, determined by iodometric analysis, is 4.5 g of active oxygen/100 g of polymer.

Example 10

Obtainment of the Commercial Products Fomblin® Z from a Peroxidic Perfluoropolyether (PFPE) (I)

3,180 g of peroxidic perfluoropolyether of the Example 6 having a m/n ratio=0.71, obtained by using the HFC-125/227ea mixture, were subjected to thermal treatment and fluorination according to the procedure of the Example 5.

2,350 g of a product, corresponding to a yield of 74%, are obtained, having the following formula:

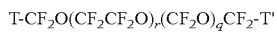

T-CF$_2$O(CF$_2$CF$_2$O)$_r$(CF$_2$O)$_q$CF$_2$-T' wherein the end groups —CF$_2$T and —CF$_2$T' are equal or different. The end groups and the respective molar percentages with respect to the total of the end groups are the following: —CF$_3$ 75.1%; —CF$_2$Cl 24.9%; the number average molecular weight is equal to 20,500; r=94.3 and q=144.9 such that the r/q ratio between the ether units=0.65.

Said product is fractionated by molecular distillation under vacuum to give the commercial products Fomblin® Z reported in Table 1.

By comparing the m/n ratio of the peroxidic PFPE with the r/q ratio of the product obtained therefrom, it is evident that the thermal treatment does not substantially change the ratio between the ether units (CF$_2$CF$_2$O), (CF$_2$O)

Example 11

Comparative

The Example 10 was repeated but by using 3,195 g of the peroxidic perfluoropolyether of the Example 8 (comparative) obtained by using FC-218 and having a m/n ratio=1.4.

2,560 g of a product, corresponding to a yield of 80%, are obtained, whose formula is the following:

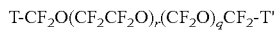

T-CF$_2$O(CF$_2$CF$_2$O)$_r$(CF$_2$O)$_q$CF$_2$-T' wherein the end groups —CF$_2$T and —CF$_2$T' are equal or different. The end groups and the respective molar percentages with respect to the total of the end groups are the following: —CF$_3$ 72.1%; —CF$_2$Cl 27.9%; the number average molecular weight is equal to 19,900 uma; r=119.4 and q=91.6 such that the r/q ratio between the ether units=1.3.

By comparing the data of the Example 10 with those of the Example 11 (comparative) it results that the non peroxidic perfluoropolyether shows a r/q ratio between the ether units out of the range required for the commercial products Fomblin®Z reported in Table 1.

Furthermore, by comparing the m/n ratio of the peroxidic PFPE with the r/q ratio of the product obtained here, it is evident that the thermal treatment does not substantially affect the ratio between the ether units (CF$_2$CF$_2$O), (CF$_2$O).

TABLE 1

| Commercial name | Colour | MW | r/q (NMR) | Fomblin ® Z Viscosity at 20° C. (cSt) | Viscosity at 40° C. (cSt) | Viscosity at 100° C. (cSt) | V.I. | P.P. (° C.) | Loss at evaporation % (22 h) 149° C. | Loss at evaporation % (22 h) 204° C. | Density @ 20° C. (g/ml) | Surface tension @ 20° C. (dyne/cm) |
|---|---|---|---|---|---|---|---|---|---|---|---|---|
| Z 03 | colourless | 4000 | 0.7 | 30 | 18 | 5.6 | 317 | −90 | 6 | — | 1.82 | 23 |
| Z 15 | colourless | 8000 | 0.7 | 160 | 92 | 28 | 334 | −80 | 0.2 | 1.2 | 1.84 | 24 |
| Z 25 | colourless | 9500 | 0.7 | 260 | 159 | 49 | 358 | −75 | <l.r. | 0.4 | 1.85 | 25 |
| Z 60 | colourless | 13000 | 0.7 | 600 | 355 | 98 | 360 | −63 | <l.r. | 0.2 | 1.85 | 25 |

TABLE 2

Fomblin ® M

| Commercial name | Colour | MW | m/n (NMR) | Viscosity at 20° C. (cSt) | Viscosity at 40° C. (cSt) | Viscosity at 100° C. (cSt) | V.I. | P.P. (° C.) | Loss at evaporation % (22 h) 149° C. | Loss at evaporation % (22 h) 204° C. | Density @ 20° C. (g/ml) | Surface tension @ 20° C. (dyne/cm) |
|---|---|---|---|---|---|---|---|---|---|---|---|---|
| M 03 | colourless | 4000 | 1 | 30 | 17 | 5 | 253 | −85 | 15 | — | 1.81 | 23 |
| M 15 | colourless | 8000 | 1 | 150 | 85 | 22 | 286 | −75 | 0.8 | 3 | 1.83 | 24 |
| M 30 | colourless | 9800 | 1 | 280 | 159 | 45 | 338 | −65 | <l.r. | 0.7 | 1.85 | 25 |
| M 60 | colourless | 12500 | 1 | 550 | 310 | 86 | 343 | −60 | <l.r. | 0.4 | 1.86 | 25 |

MW: molecular weight
V.I.: viscosity index
P.P.: pour point

The invention claimed is:

1. A process for preparing peroxidic perfluoropolyethers of formula (I)

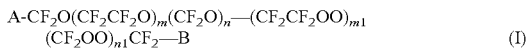

$$A\text{-}CF_2O(CF_2CF_2O)_m(CF_2O)_n\text{---}(CF_2CF_2OO)_{m1}(CF_2OO)_{n1}CF_2\text{---}B \quad (I)$$

wherein
A, B, equal to or different from each other are selected from the group consisting of —Cl, —F, —F$_2$CCl, —COF, —OCOF, —OF$_3$;
m, m1, n, n1 are integers such that the (m+m1)/(n+n1) ratio is between 0.6 and 1.3, where (n+n1) is different from 0 and the m/n ratio is between 0.5 and 1.2, where n is different from 0;
having a peroxidic content (PO) lower than or equal to 1.2 and a number average molecular weight in the range of 35,000-45,000, wherein:
when m/n is between 0.5 and 0.8 (n being different from 0); the PO is between 0.5 and 1.0;
when m/n is above 0.8 and less than or equal to 1.2 (n being different from 0), the PO is above 1.0 and less than or equal to 1.2;
the process comprising tetrafluoroethylene (TFE) photooxidation in the presence of UV light and oxygen, at a temperature of from −80° C. to −40° C. in the presence of a mixture of solvents formed of HFC-227 (heptafluoropropane) and a solvent selected from HFC-125 (pentafluoroethane) and FC-218 (perfluoropropane), in a volumetric ratio HFC 125 (or FC 218)/HFC 227 between 90/10 and 10/90 in the presence of a regulating transfer agent.

2. A process according to claim 1, wherein the TFE concentration is between 0.005 and 0.06 moles/liter of reaction mixture.

3. A process according to claim 1, wherein the oxygen is in molar excess with respect to the TFE and the partial oxygen pressure is generally between 0.1 and 2 atm.

4. A process according to claim 1, wherein the volumetric ratio HFC 125/HFC 227 is between 90/10 and 40/60; or wherein the volumetric ratio FC 218/HFC 227 is between 70/30 and 30/70.

5. A process according to claim 1, wherein the chain transfer agent is selected from fluorine diluted with an inert gas or chlorotrifluoroethylene.

6. A process according to claim 1 to prepare peroxidic perfluoropolyethers (I) having a PO between 0.5 and 1.0, a number average molecular weight in the range 35,000-45,000 and a m/n ratio between 0.5 and 0.8, wherein:
the temperature is between −55° C. and −50° C.;
the feeding TFE flow-rate per volume unit is between 10 and 30 kg/(h·m$_3$);
the feeding O$_2$ flow-rate is such that the molar ratio O$_2$/TFE is between 1.1 and 3;
the volumetric ratio HFC 125/227 is between 85/15 and 70/30, or the volumetric ratio FC-218/HFC-227 is between 70/30 and 30/70;
in the presence of a chain transfer agent selected from fluorine diluted with an inert gas or chlorotrifluoroethylene, in an amount such that the molar ratio chain transfer agent/tetrafluoroethylene is between $1 \cdot 10^{-2}$ and $1 \cdot 10^{-3}$ and, in case of fluorine, said chain transfer agent is diluted with the inert gas in volume ratios from 1/50 to 1/1,000.

7. A process according to claim 1 to prepare peroxidic perfluoropolyethers (I) having a PO above 1.0 and less than or equal to 1.2, a number average molecular weight in the range 35,000-45,000 and a m/n ratio above 0.8 and less than or equal to 1.2, wherein:
the temperature is between −65° C. and −55° C.;
the feeding TFE flow-rate per volume unit is between 10 and 30 kg/(h·m$^3$);
the feeding O$_2$ flow-rate is such that the molar ratio O$_2$/TFE is between 1.1 and 3;
the volumetric ratio HFC 125/227 is between 85/15 and 70/30, or the volumetric ratio FC-218/HFC 227 is between 70/30 and 30/70;
in the presence of a chain transfer agent selected from fluorine diluted with an inert gas or chlorotrifluoroethylene, in an amount such that the molar ratio chain transfer agent/tetrafluoroethylene is between $1 \cdot 10^{-2}$ and $1 \cdot 10^{-3}$ and, in case of fluorine, it is diluted with the inert gas in volume ratios from 1/50 to 1/1,000.

8. A process according to claim 1, wherein the mixture of solvents is HFC 125/227.

* * * * *